(12) United States Patent
Wang et al.

(10) Patent No.: US 12,495,229 B2
(45) Date of Patent: Dec. 9, 2025

(54) SINGLE SERVICE RESOURCE CONFIGURATION METHOD AND APPARATUS, COMPUTER DEVICE AND MEDIUM

(71) Applicant: ZTE CORPORATION, Guangdong (CN)

(72) Inventors: Dajiang Wang, Guangdong (CN); Youdao Ye, Guangdong (CN); Xiaojian Li, Guangdong (CN); Hu Shi, Guangdong (CN); Zhenyu Wang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 238 days.

(21) Appl. No.: 18/037,742

(22) PCT Filed: Nov. 9, 2021

(86) PCT No.: PCT/CN2021/129501
§ 371 (c)(1),
(2) Date: May 18, 2023

(87) PCT Pub. No.: WO2022/105642
PCT Pub. Date: May 27, 2022

(65) Prior Publication Data
US 2024/0007775 A1    Jan. 4, 2024

(30) Foreign Application Priority Data
Nov. 18, 2020   (CN) .......................... 202011293457.8

(51) Int. Cl.
*H04Q 11/00* (2006.01)
*H04B 10/079* (2013.01)
*H04J 3/16* (2006.01)

(52) U.S. Cl.
CPC ... *H04Q 11/0062* (2013.01); *H04B 10/07953* (2013.01); *H04J 3/1652* (2013.01);
(Continued)

(58) Field of Classification Search
CPC ....... H04Q 11/0062; H04Q 2011/0073; H04Q 2011/0084; H04Q 2011/0086;
(Continued)

(56) References Cited

U.S. PATENT DOCUMENTS

2017/0331706 A1*  11/2017  Lu ........................ H04L 41/5009
2018/0123945 A1*  5/2018  Wang ...................... H04L 45/42
(Continued)

FOREIGN PATENT DOCUMENTS

CN          109905784 A  *  6/2019

*Primary Examiner* — Hibret A Woldekidan
(74) *Attorney, Agent, or Firm* — Li & Cai Intellectual Property (USA) Office

(57) ABSTRACT

The present disclosure provides a service resource configuration method, including: configuring resource parameters for a service to be configured according to an action policy, calculating a timely reward in a current state, performing IV analysis according to the action policy, and ending one episode after the IV analysis is completed; calculating and updating, according to the timely reward in each state, an optimization objective policy parameter in each state; iterating a preset number of episodes to calculate and update the optimization objective policy parameter in each state; determining, according to the optimization objective policy parameter in each state in the preset number of episodes, an optimal optimization objective policy parameter in each state; and updating the action policy according to the optimal optimization objective policy parameter in each state. The present disclosure further provides a single service resource configuration apparatus, a computer device and a computer-readable medium.

20 Claims, 3 Drawing Sheets

(52) U.S. Cl.
CPC ............... *H04Q 2011/0073* (2013.01); *H04Q 2011/0084* (2013.01); *H04Q 2011/0086* (2013.01)

(58) Field of Classification Search
CPC ....... H04Q 2011/0064; H04B 10/07953; H04J 3/1652; H04L 45/645; H04L 41/5009; H04L 45/124; H04L 41/145; H04L 41/147; H04L 41/149; H04L 41/14; H04L 41/142; H04L 41/16; H04L 41/20; H04L 41/18; H04L 45/14; H04L 47/70
See application file for complete search history.

(56) References Cited

U.S. PATENT DOCUMENTS

| | | | |
|---|---|---|---|
| 2019/0138948 A1* | 5/2019 | Janulewicz | H04L 45/124 |
| 2019/0229830 A1* | 7/2019 | Bruno | H04L 41/40 |
| 2023/0319446 A1* | 10/2023 | Wang | H04Q 11/0067 |
| 2023/0361902 A1* | 11/2023 | Wang | H04L 41/0823 |

* cited by examiner

SINGLE SERVICE RESOURCE CONFIGURATION METHOD AND APPARATUS, COMPUTER DEVICE AND MEDIUM

CROSS-REFERENCE TO RELATED APPLICATIONS

The present disclosure is a National Phase Application filed under 35 U.S.C. 371 as a national stage of PCT/CN2021/129501, filed on Nov. 9, 2021, an application claiming the priority to Chinese Patent Application No. 202011293457.8 filed with the CNIPA on Nov. 18, 2020, the entire contents of which are incorporated herein by reference.

TECHNICAL FIELD

The present disclosure relates to the field of artificial intelligence technology.

BACKGROUND

With the development of artificial intelligence technology, application of the reinforcement learning technology has gained more and more attention in various fields and industries. Reinforcement learning, also called assessment learning, is an important machine learning method that has many applications in fields of intelligent control robots, network analysis and prediction, and the like. The connectivism machine learning school divides learning algorithms into three types, i.e., unsupervised learning, supervised learning, and reinforcement learning.

Reinforcement learning is a mode in which an agent learns in a trial-and-error manner, and takes actions under the guidance of rewards obtained through interaction with the environment, aiming to obtain a maximum reward. The main difference of the reinforcement learning from the supervised learning in the connectivism learning lies in reinforcement signals. The reinforcement signals provided by the environment for the reinforcement learning are used to assess quality of the generated actions (and are generally referred to as scalar signals), instead of telling a reinforcement learning system (RLS) how to generate a correct action. Since little information is provided from the external environment, the RLS has to learn on its own experience. In this manner, the RLS gains knowledge in the action-assessment environment, and improves the action scheme to adapt to the environment.

In recent years, with the application and popularization of the reinforcement learning technology, how to apply reinforcement learning to the field of optical transport network (OTN) intelligent management and control and operation and maintenance, especially to optimized configuration of service resources in the OTN optical channel layer, has received wide attention from experts in the OTN field.

SUMMARY

In a first aspect, the present disclosure provides a single service resource configuration method, including: configuring resource parameters for a service to be configured according to an action policy, calculating a timely reward in a current state, performing, after all the resource parameters are configured, impairment verification (IV) analysis according to the action policy, and ending one episode after the impairment verification analysis is completed, wherein a next state is entered after an action in the action policy is completed, and the action includes an action of configuring a resource parameter or an action of performing IV analysis; calculating and updating, according to the timely reward in each state, an optimization objective policy parameter in each state; iterating a preset number of episodes to calculate and update the optimization objective policy parameter in each state; determining, according to the optimization objective policy parameter in each state in the preset number of episodes, an optimal optimization objective policy parameter in each state; and updating the action policy according to the optimal optimization objective policy parameter in each state.

In some embodiments, the resource parameters include a route, a wavelength, a spectrum, and a modulation format, and the resource parameters are configured for the service to be configured within one episode in a sequence of: configuring the route, configuring the wavelength, configuring the spectrum, and configuring the modulation format.

In some embodiments, the state includes: a route to be configured state, a wavelength to be configured state, a spectrum to be configured state, a modulation format to be configured state, an IV analysis to be performed state, and an end state, in the route to be configured state, the timely reward $R_0=0$, and in other states, the timely rewards meet any one or combination of the following conditions: in the wavelength to be configured state, a timely reward $R_1$ is a function of a working route cost, and $R_1$ and the working route cost is monotonically decreasing; in the spectrum to be configured state, a timely reward $R_2$ is a function of a wavelength resource utilization rate, and $R_2$ and the wavelength resource utilization rate is monotonically increasing; in the modulation format to be configured state, a timely reward $R_3$ is a function of service occupied bandwidth, and $R_3$ and the service occupied bandwidth is monotonically decreasing; in the IV analysis to be performed state, a timely reward $R_4$ is a function of a service spectral efficiency, and $R_4$ and the service spectral efficiency is monotonically increasing; in the end state, a timely reward $R_5$ is related to a result of the IV analysis, wherein $R_5$ is positive when the result of the IV analysis is qualified, and $R_5$ is negative when the result of the IV analysis is unqualified.

In some embodiments, the action policy includes a random action policy and a deterministic action policy, and configuring resource parameters for the service to be configured according to the action policy includes: configuring a route, a wavelength, a frequency spectrum and a modulation format for the service to be configured according to the random action policy; and performing IV analysis according to the action policy includes: performing IV analysis according to the deterministic action policy.

In some embodiments, when the route of the service to be configured includes a plurality of hops, configuring resource parameters for the service to be configured according to the action policy includes: configuring resource parameters for the service to be configured according to the action policy in each hop, performing IV analysis according to the action policy includes: performing IV analysis according to the action policy in each hop; and performing IV analysis includes: calculating a pre-calculated value of an optical signal noise ratio of each hop in the route of the service to be configured; determining, in response to the pre-calculated value of the optical signal noise ratio of each hop meeting a preset condition, that a result of the IV analysis is qualified; and determining, in response to pre-calculated value of the optical signal noise ratio of at least one hop not meeting the preset condition, that the result of the IV analysis is unqualified.

In some embodiments, performing IV analysis includes: calculating a pre-calculated value of an optical signal noise ratio of the service to be configured; determining, in response to that pre-calculated value of the optical signal noise ratio meeting a preset condition, that a result of the IV analysis is qualified; and determining, in response to the pre-calculated value of the optical signal noise ratio not meeting the preset condition, that the result of the IV analysis is unqualified.

In some embodiments, a case where pre-calculated value of the optical signal noise ratio meets the preset condition includes: $OSNR_{pre\text{-}calculated\ value} - OSNR_{flatness} \geq OSNR_{transmission\ threshold}$, $OSNR_{transmission\ threshold} = OSNR_{B2B} + OSNR_{nonlinear} + OSNR_{CD} + OSNR_{PMD} + OSNR_{filter} + OSNR_{PCL} + OSNR_{fluctuation} + OSNR_{net\ allowance}$; where $OSNR_{pre\text{-}calculated\ value}$ is the pre-calculated value of the optical signal noise ratio, $OSNR_{flatness}$ is a flatness of the optical signal noise ratio, $OSNR_{B2B}$ is a back-to-back optical signal noise ratio, $OSNR_{nonlinear}$ is a nonlinear cost of the optical signal noise ratio, $OSNR_{CD}$ is a chromatic dispersion cost of the optical signal noise ratio, $OSNR_{PMD}$ is a polarization mode dispersion cost of the optical signal noise ratio, $OSNR_{filter}$ is a filter membrane cost of the optical signal noise ratio, $OSNR_{PDL}$ is a polarization dependent loss cost of the optical signal noise ratio, $OSNR_{fluctuation}$ is a fluctuation of the optical signal noise ratio, $OSNR_{net\ allowance}$ is a net allowance required by the optical signal noise ratio, and $OSNR_{flatness}$, $OSNR_{B2B}$, $OSNR_{nonlinear}$, $OSNR_{CD}$, $OSNR_{PMD}$, $OSNR_{filter}$, $OSNR_{PDL}$, $OSNR_{fluctuation}$ and $OSNR_{net\ allowance}$ are preset values.

In some embodiments, calculating and updating, according to the timely reward in each state, the optimization objective policy parameter in each state includes: calculating, according to timely rewards in various states after a next state, an expected return in a current state; and calculating and updating, according to the expected return in the current state, the optimization objective policy parameter in the current state. In some embodiments, the expected return in the current state is calculated by:

$$G_t = \sum_{k=0}^{n-(t+1)} \gamma^k R_{t+k+1},$$

where $G_t$ is an expected return of executing action $\alpha_t$ in state $S_t$, $\gamma$ is a discount coefficient, and $0 < \gamma < 1$; R is the timely reward, t is the number of resource parameters already configured in state $S_t$, $t=(0, \ldots, n-1)$, and $n-1$ is the total number of resource parameters.

In some embodiments, the optimization objective policy parameter includes a state behavior value $Q_\pi(s,\alpha)$, $$Q_\pi(s, a) = E_\pi\left[\sum_{k=0}^{n-(t+1)} \gamma^k R_{t+k+1} \mid s = s_t, a = a_t\right],$$

or the optimization objective policy parameter includes a state value $V_\pi(s)$, $$V_\pi(s) = \sum_{a \in A} \pi(a \mid s) Q_\pi(s, a),$$

where $\pi(\alpha\backslash s)$ is a probability of taking action $\alpha$ according to an action policy $\pi(s, \alpha)$ in state S, and A is a set of actions executed in each state.

In some embodiments, when the optimization objective policy parameter is the state behavior value $Q_\pi(s,\alpha)$, the optimization objective policy parameter in each state is calculated and updated with a Monte Carlo Process algorithm, a TD-Error algorithm of different policies or a TD-Error algorithm of a same policy, and updating the action policy according to the optimal optimization objective policy parameter in each state includes: updating the action policy according to the state behavior value $Q_\pi(s, \alpha)$.

In some embodiments, when the optimization objective policy parameter is the state value $V_\pi(s)$, the optimization objective policy parameter is calculated with a dynamic programming algorithm; and updating the action policy according to the optimal optimization objective policy parameter in each state includes: updating the action policy according to the state value $V_\pi(s)$.

In another aspect, the present disclosure provides a single service resource configuration apparatus, including: a first processing module, a second processing module and an updating module, wherein the first processing module is configured to configure resource parameters for a service to be configured according to an action policy, calculate a timely reward in a current state, perform, after all the resource parameters are configured, impairment verification (IV) analysis according to the action policy, and end one episode after the IV analysis is completed, wherein a next state is entered after an action in the action policy is completed, and the action includes an action of configuring a resource parameter or an action of performing IV analysis; calculate and update, according to the timely reward in each state, an optimization objective policy parameter in each state; and iterate a preset number of episodes to calculate and update the optimization objective policy parameter in each state; the second processing module is configured to determine, according to the optimization objective policy parameter in each state in the preset number of episodes, an optimal optimization objective policy parameter in each state; and the updating module is configured to update the action policy according to the optimal optimization objective policy parameter in each state.

In yet another aspect, the present disclosure provides a computer device, including: one or more processors; a storage means having one or more programs stored thereon, wherein the one or more programs, when executed by the one or more processors, cause the one or more processors to implement the single service resource configuration method as described above.

In still another aspect, the present disclosure provides a computer-readable medium storing a computer program thereon, wherein the program, when executed, causes the single service resource configuration method as described above to be implemented.

DETAIL DESCRIPTION OF EMBODIMENTS

Figure 1:
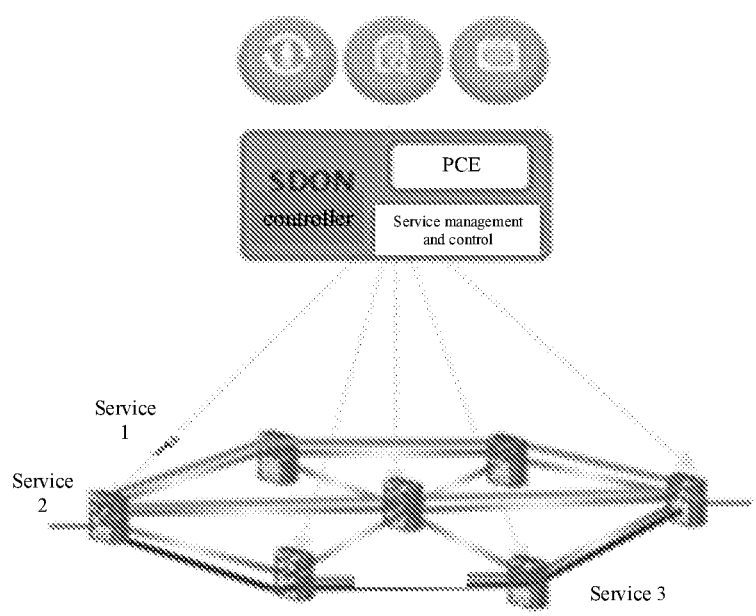
FIG. 1 is a schematic diagram of OTN single service resource configuration under a Software Defined Optical Network (SDON) architecture.

Example embodiments will be described more sufficiently below with reference to the accompanying drawings, but which may be embodied in different forms and should not be construed as limited to the embodiments set forth herein. Rather, these embodiments are provided so that the present disclosure will be thorough and complete, and will fully convey the scope of the present disclosure to those skilled in the art.

As used herein, the term "and/or" includes any and all combinations of one or more of the associated listed items.

The terminology used herein is for the purpose of describing specific embodiments only and is not intended to limit the present disclosure. As used herein, the singular forms "a", "an" and "the" are intended to include the plural forms as well, unless the context clearly indicates otherwise. It will be further understood that as used herein, the terms "comprise" and/or "consist of . . . " specify the presence of stated features, integers, steps, operations, elements, and/or components, but do not preclude the presence or addition of one or more other features, integers, steps, operations, elements, components, and/or groups thereof.

Embodiments described herein may be described with reference to plan and/or sectional views in idealized representations of the present disclosure. Accordingly, the example illustrations may be modified in accordance with manufacturing techniques and/or tolerances. Accordingly, the embodiments are not limited to the embodiments shown in the drawings, but include modifications of configurations formed based on a manufacturing process. Thus, the regions illustrated in the figures have schematic properties, and the shapes of the regions shown in the figures illustrate specific shapes of regions of elements, but are not intended to be limiting.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the existing art and the present disclosure, and will not be interpreted in an idealized or overly formal sense unless expressly so defined herein.

FIG. 1 is a schematic diagram of OTN single service resource configuration under an SDON architecture.

In the SDON architecture, a path computation element (PCE) mainly undertakes routing computation and resource allocation functions for OTN services, provides optimized paths which meet costs and other target policies for the services, and performs resource configuration and evaluation, such as Routing and Wavelength Assignment (RWA), Routing and Spectrum Assignment (RSA), Software Defined Optics (SDO), Impairment Verification (IV) and the like, on the basis of the optimized paths, to finally obtain service resource paths meeting optimization conditions of comprehensive indicators. In a traditional resource configuration scheme for a single service in the OTN, calculation and configuration of path resources are implemented step by step, rather than completely completed and realized in a unified algorithm. As a result, the effect of optimized configuration of service resources, the degree of comprehensive optimization, the optimization efficiency, the strictness of the optimization algorithm theory, and the like all have certain disadvantages.

In the present disclosure, the reinforcement learning technology is adopted for creation and comprehensive optimization of an OTN single service. Since a design of the reinforcement learning algorithm model is close to flows and rules of an SDON management and control system for creation and resource allocation of a single service, the reinforcement learning technique can be ensured to comprehensively cover all flows and functional operations in comprehensive optimization of the OTN single service, and to be perfectly combined with the scene of comprehensive optimization of the OTN single service as much as possible, so that the reinforcement learning technology can be ensured to solve the problem of comprehensive optimization of the OTN single service in a manner suitable for local conditions and circumstances, and that an intelligent optimization effect of the reinforcement learning on the OTN single service can be fully exerted.

The OTN single service mentioned in the present disclosure refers to a wavelength level service of an optical channel layer (i.e., an OCh layer, also called an LO layer), and in an optimization calculation process of the OTN single service, the network environment (mainly including a network topology state, the number of other services in the OTN, a route, a resource allocation state, and the like) where the OTN service is located remains unchanged.

Relevant parameters in the reinforcement learning algorithm model are defined as follows:

1. Definition of Episode

The whole process of adopting a certain action policy to complete routing determination, wavelength configuration, spectrum resource configuration, modulation format configuration (SDO) and impairment verification (IV) analysis of one OTN service is defined as a complete episode.

2. Definitions of Action $\alpha_t$ and Action Policy $\pi(s,\alpha)$

The action $\alpha_t$ includes an action of configuring a resource parameter or an action of performing IV analysis. The resource parameters may include: a route, a wavelength, a spectrum resource, and a modulation format, $t=(0, \ldots, n-1)$, and $n-1$ is the total number of resource parameters. In an embodiment of the present disclosure, $n-1=4$, which means that one episode includes 5 actions, $\alpha_0$ to $\alpha_4$.

The action policy $\pi(s,\alpha)$ includes a random action policy and a deterministic action policy. The random action policy may be represented by $\pi'(s,\alpha)$, and the deterministic action policy may be represented by $\mu(s,\alpha)$ (or $\mu(s)$).

Action sets for resource configuration of a OTN single service are listed below:

(1) Action set $\alpha_0$: route configuration actions. Depending on routing constraint conditions (including mandatory nodes and links, mandatory avoided nodes and links, and the like) and differences in route selections, the action set $\alpha_0$ includes a plurality of actions for route allocation, such as allocating route A, route B, route C . . . or the like to the service to be configured.

(2) Action set $\alpha_1$: wavelength configuration actions, including configuring a wavelength for the route of the service to be configured following the wavelength consistency and wavelength continuity principles. Depending on differences in wavelength values, the action set $\alpha_1$ includes a plurality of actions for wavelength configuration, such as configuring wavelength L, wavelength M, wavelength N . . . or the like for the route of the service to be configured. It should be noted that if the route includes hops, different wavelengths may be used for different hops.

(3) Action set $\alpha_2$: spectrum configuration actions, including configuring a spectrum for the route of the service to be configured. Depending on differences in bandwidth values, the action set $\alpha_2$ includes a plurality of actions for spectrum configuration, such as configuring bandwidth x, bandwidth y, bandwidth z . . . or the like for the route of the service to be configured. It should be noted that if the route includes hops, different bandwidths may be used for different hops.

(4) Action set $\alpha_3$: SDO (modulation format) configuration actions, including configuring a modulation format for the route of the service to be configured. Depending on differences in attribute values of the modulation format, the action set $\alpha_3$ includes a plurality of actions for SDO configuration, such as configuring modulation format i, modulation format j, modulation format k . . . or the like for the route of the service to be configured. It should be noted that if the route includes hops, different modulation formats may be used for different hops.

(5) Action set $\alpha_4$: IV analysis actions, including based on the route of the service to be configured and network resources configured along the route, performing IV analysis along the route. It should be noted that if the route includes hops, different back-to-back optical signal noise ratios $OSNR_{B2B}$ are used for IV analysis of different hops.

In a multi-hop scenario, due to different resource configurations and IV analysis among the hops, on the premise that resource configuration constraints and attribute setting constraints of each service of the OTN are met, each action set may be further split into multiple action sets taking a hop as a unit. For example, an action set $\alpha_{11}$ indicates actions for allocating wavelengths in a first hop of the route of the service to be configured, and an action set $\alpha_{12}$ indicates actions for allocating wavelengths in a second hop of the route of the service to be configured.

3. Definitions of States $S_t$ in Configuration of a Single Service

Each state in one episode is denoted as $S_t$, where t=(0, . . . , n), and n is the total number of resource parameters+1. In an embodiment of the present disclosure, the total number of resource parameters is 4, and n=5, and therefore, one episode includes 6 states, i.e., $S_0$ to $S_5$. $S_0$ is an initial state, i.e., a route to be configured state, in which no resource parameter is configured; $S_1$ is a wavelength to be configured state, in which a route is configured (i.e., the route configuration action $\alpha_0$ is executed), but no wavelength is configured; $S_2$ is a spectrum to be configured state, in which a route and a wavelength are configured (i.e., the route configuration action $\alpha_0$ and the wavelength configuration action $\alpha_1$ are executed), but no spectrum is configured; $S_3$ is a modulation format to be configured state, in which a route, a wavelength and a spectrum are configured (i.e., the route configuration action $\alpha_0$, the wavelength configuration action $\alpha_1$, and the spectrum configuration action $\alpha_2$ are executed), but no modulation format is configured; $S_4$ is an IV analysis state, in which a route, a wavelength, a spectrum and a modulation format are configured (i.e., the route configuration action $\alpha_0$, the wavelength configuration action $\alpha_1$, the spectrum configuration action $\alpha_2$, and the modulation format configuration action $\alpha_3$ are executed), but IV analysis is not performed; $S_5$ is an end state, in which all resource parameters are configured and the IV analysis is performed (i.e., the route configuration action $\alpha_0$, the wavelength configuration action $\alpha_1$, the spectrum configuration action $\alpha_2$, the modulation format configuration action $\alpha_3$, and the IV analysis action $\alpha_4$ are executed). Once the end state is reached, it indicates that an episode is ended.

Taking a service request from nod A to node D as an example, in state $S_0$, a route configuration action $\alpha_0$ is performed to select a working route from candidate routes; in state $S_1$, a wavelength configuration action $\alpha_1$ is performed to allocate a wavelength for the working route; in state $S_2$, a spectrum configuration action $\alpha_2$ is performed to allocate a spectrum for the route with the allocated wavelength; in state $S_3$, an SDO configuration action $\alpha_3$ is performed to configure a modulation format for the route with the allocated wavelength and spectrum; in state $S_4$, an IV analysis action $\alpha_4$ is performed to perform IV analysis on the route with the allocated wavelength, spectrum and SDO; and in state $S_5$, the IV analysis is completed and the episode is ended.

In a multi-hop scenario, the next states $S_1$, $S_2$, $S_3$, $S_4$, and $S_5$ corresponding to the actions $\alpha_0$, $\alpha_1$, $\alpha_2$, $\alpha_3$, and $\alpha_4$ may be split into a plurality of states along with the splitting of actions in different hops. That is, the states may be divided in units of hops. In a multi-hop scenario, the entire episode is ended only when all the hops therein enter the end state $S_5$.

Figure 2:
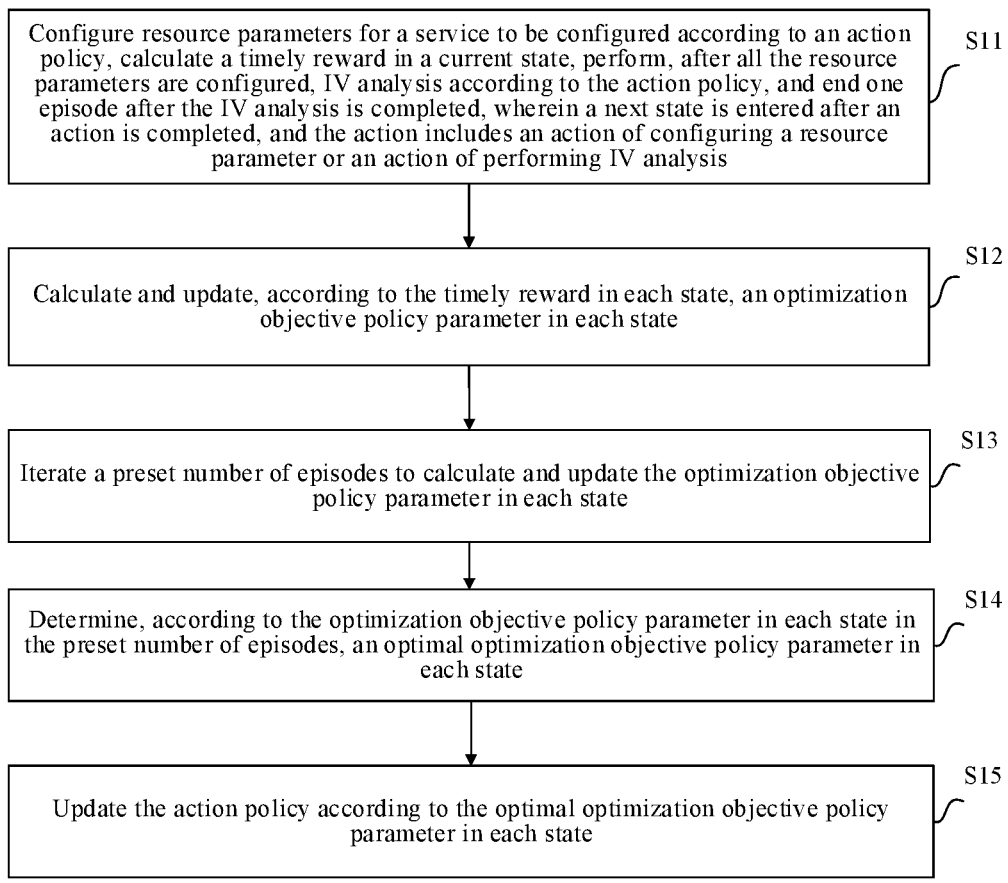
FIG. 2 is a flowchart of a single service resource configuration method according to the present disclosure.

FIG. 2 is a flowchart of a single service resource configuration method according to the present disclosure.

As shown in FIG. 2, the single service resource configuration method according to the present disclosure includes the following operations S11 to S15.

At operation S11, configuring resource parameters for a service to be configured according to an action policy, calculating a timely reward in a current state, performing, after all the resource parameters are configured, IV analysis according to the action policy, and ending one episode after the IV analysis is completed, where a next state is entered after an action in the action policy is completed, and the action includes an action of configuring a resource parameter or an action of performing IV analysis.

In this operation, within one episode, resource parameters are configured for a service to be configured according to an action policy $\pi(s,\alpha)$, and when one resource parameter is configured, a timely reward in that state is calculated. Then, the current state is ended and a next state is entered. According to the above operation, resource parameters are configured in one episode, respectively, and timely rewards under corresponding states are calculated, until all resource parameters are configured, and IV analysis is performed. Then, one episode is ended.

At operation S12, calculating and updating, according to the timely reward in each state, an optimization objective policy parameter in each state.

In this operation, different algorithms may be used to calculate and update the optimization objective policy parameter. However, it should be noted that different algorithms are used for different optimization objective policy parameters, and detailed description of the algorithms will be given later.

At operation S13, iterating a preset number of episodes to calculate and update the optimization objective policy parameter in each state.

In this operation, operations S11 to S12 are repeated to iterate the preset number of episodes, so as to calculate and update the optimization objective policy parameter in each state of each episode.

At operation S14, determining, according to the optimization objective policy parameter in each state in the preset number of episodes, an optimal optimization objective policy parameter in each state.

In this operation, for each state, the optimal optimization objective policy parameter in that state is determined from optimization objective policy parameters in different episodes. It should be noted that different algorithms may determine the optimal optimization objective policy parameter in different manners. After this operation, optimal optimization target policy parameters of the service to be configured in all states can be obtained.

At operation S15, updating the action policy according to the optimal optimization objective policy parameter in each state.

The optimization objective policy parameter is used for representing a state and an action. When the optimal optimization objective policy parameter in a certain state is determined, an optimal action $\alpha_t$ in that state, i.e., an action for configuring an optimal resource parameter in that state, can be determined, so that the optimal resource parameter in that state can be determined, thereby obtaining an action set of all optimal resource parameters, i.e., an optimized action policy $\pi(s,\alpha)$.

According to the single service resource configuration method and apparatus of the present disclosure, resource parameters are configured for a service to be configured according to an action policy, a timely reward in a current state is calculated, after all the resource parameters are configured, IV analysis is performed according to the action policy, and one episode is ended after the IV analysis is completed, where a next state is entered after an action is completed, and the action includes an action of configuring a resource parameter or an action of performing IV analysis; according to the timely reward in each state, an optimization objective policy parameter in each state is calculated and updated; a preset number of episodes is iterated to calculate and update the optimization objective policy parameter in each state; according to the optimization objective policy parameter in each state in the preset number of episodes, an optimal optimization objective policy parameter in each state is determined; and according to the optimal optimization objective policy parameter in each state, the action policy is updated. By means of a reward and punishment mechanism of the reinforcement learning algorithm, the present disclosure performs comprehensive optimization on various resources and performance indexes, optimizes resource configuration for an OTN single service, and thus provides an OTN service path with optimized comprehensive indexes for a user, and thereby obtaining an action policy with good convergence, high rigidness and high reliability.

In some embodiments, the resource parameters may include a route, a wavelength, a spectrum, and a modulation format, and the resource parameters are configured for the service to be configured within one episode in a sequence of: configuring the route, configuring the wavelength, configuring the spectrum, and configuring the modulation format. It should be noted that the present disclosure is described by taking the sequence of configuring a route, configuring a wavelength, configuring a spectrum, and configuring a modulation format as an example, but those skilled in the art will know that the sequence of resource parameter configuration and the types and number of resource parameters are not limited as long as it is ensured that the IV analysis is performed after all resource parameters are configured.

In some embodiments, the states include: a route to be configured state $S_0$, a wavelength to be configured state $S_1$, a spectrum to be configured state $S_2$, a modulation format to be configured state $S_3$, an IV analysis to be performed state $S_4$, and an end state $S_5$. $R_t$ represents a timely reward obtained in state $S_t$, which is a timely reward obtained after performing action $\alpha_{t-1}$ in state $S_{t-1}$ and shifting to state $S_t$, t is the number of resource parameters already configured in state $S_t$, t=(0, . . . , n−1), and n−1 is the total number of resource parameters. It should be noted that in the route to be configured state $S_0$, the timely reward $R_0$=0, and in other states, the timely rewards meet any one or combination of the following conditions (1) to (5):

(1) In the wavelength to be configured state $S_1$, a timely reward $R_1$ is a function of a working route cost, and $R_1$ and the working route cost is monotonically decreasing. In other words, $R_1$ may be a function of the working route cost Svc Cost obtained after the service to be configured is subjected to action $\alpha_0$, and there is a monotonically decreasing relationship between $R_1$ and the working route cost Svc Cos t.

(2) In the spectrum to be configured state $S_2$, a timely reward $R_2$ is a function of a wavelength resource utilization rate, and $R_2$ and the wavelength resource utilization rate is monotonically increasing. In other words, $R_2$ may be a timely reward obtained after the service to be configured is subjected to action $\alpha_1$ to obtain the working route wavelength resource, and under the condition that constraint conditions of wavelength consistency and continuity are met, $R_2$ may be a function of the wavelength resource utilization rate $U_\lambda$ of the current network, and there is a monotonically increasing relationship between $R_2$ and the wavelength resource utilization rate $U_\lambda$.

(3) In the modulation format to be configured state $S_3$, a timely reward $R_3$ is a function of service occupied bandwidth, and $R_3$ and the service occupied bandwidth is monotonically decreasing. In other words, $R_3$ may be a timely reward obtained after the service to be configured is subjected to action $\alpha_2$ to obtain a spectrum resource of the working route, and under a constraint condition that a minimum bandwidth usage threshold of the service to be configured is met, $R_3$ may be a function of a bandwidth $F_w$ currently occupied by the service to be configured, and there is a monotonically decreasing relationship between $R_3$ and the bandwidth $F_w$.

(4) In the IV analysis to be performed state $S_4$, a timely reward $R_4$ is a function of a service spectral efficiency, and $R_4$ and the service spectral efficiency is monotonically increasing. In other words, $R_4$ may be a timely reward obtained after the service to be configured is subjected to action $\alpha_3$ to obtain an SDO (modulation format) of the working route, and under a constraint condition that a minimum bandwidth usage threshold of the service to be configured is met, $R_4$ may be a function of a current spectral efficiency $\zeta$ of the service to be configured, and there is a monotonically increasing relationship between $R_4$ and the current spectral efficiency $\zeta$.

(5) In the end state $S_5$, a timely reward $R_5$ is related to a result of the IV analysis, where $R_5$ is positive when the result of the IV analysis is qualified, and $R_5$ is negative when the result of the IV analysis is unqualified. In other words, $R_5$ may be a timely reward obtained after the service to be configured is subjected to action $\alpha_4$ to complete the IV analysis. If the IV analysis result is qualified, which indicates that the working route meets performance requirements for service transmission, $R_5$ is assigned with a positive reward which is greater than a sum of the above four timely rewards. If the IV analysis result is unqualified, which indicates that the working route does not meet performance requirements for service transmission, $R_5$ is given with a negative reward as a penalty, which has an absolute value greater than the sum of the above four timely rewards.

In some embodiments, the action policy π(s,α) includes a random action policy π'(S,α) and a deterministic action policy μ(S,α), and configuring resource parameters for the service to be configured according to the action policy in operation S11 includes: configuring a route, a wavelength, a frequency spectrum and a modulation format for the service to be configured according to the random action policy π'(S,α). Performing IV analysis according to the action policy in operation S11 includes: performing IV analysis according to the deterministic action policy μ(S,α).

Actions $α_0$, $α_1$, $α_2$, $α_3$ correspond to four operations of route selection, wavelength allocation, spectrum allocation and SDO setting, respectively, each with a plurality of candidates. For example, one OTN service may select one of a plurality of candidate routes as a working route. If selecting one of the routes as the working route is regarded as a specific action, then action $α_0$ in state $S_0$ actually corresponds to a set of actions, and a specific action may be performed according to an action policy to select a route. Therefore, an initial policy for action $α_0$ in state $S_0$ may be a random policy $π'(s_0, α_0)$. Similarly, initial policies for actions $α_1$, $α_2$, $α_3$ in states $S_1$, $S_2$, and $S_3$ are all random action policies, i.e., $π'(s_1, α_1)$, $π'(s_2, α_2)$, $π'(s_3, α_3)$. The action $α_4$ in state $S_4$ corresponds to an IV analysis operation, and may adopt a deterministic action policy $μ(S_4, α_4)$.

The IV analysis is used for evaluating influences of factors related to OTN service transmission, such as back-to-back OSNR, optical fiber nonlinearity, optical fiber CD, optical fiber PMD, optical filtering, PDL introduced by an optical device, service multi-hop accumulated OSNR fluctuation, OSNR flatness and the like on the system performance, and on the basis, for evaluating and analyzing feasibility of the optical link resource performance passed by the OTN service according to an OSNR allowance configuration requirement of a customer and the manufacturer policy.

Figure 3:
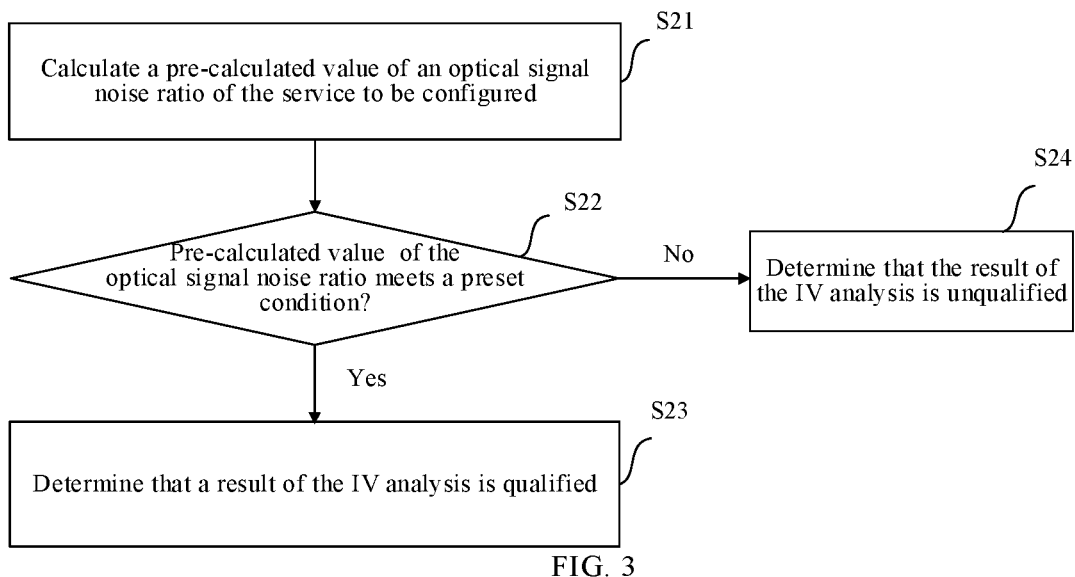
FIG. 3 is a flowchart of a method for performing IV analysis according to the present disclosure.

FIG. 3 is a flowchart of a method for performing IV analysis according to the present disclosure.

As shown in FIG. 3, the method for performing IV analysis includes the following operations S21 to S24.

At operation S21, calculating a pre-calculated value $OSNR_{pre\text{-}calculated\ value}$ of an optical signal noise ratio of the service to be configured.

In some embodiments, the pre-calculated value $OSNR_{pre\text{-}calculated\ value}$ of the optical signal noise ratio of the service to be configured may be calculated by the 58 equation, which is not described in detail here.

At operation S22, judging whether the pre-calculated value $OSNR_{pre\text{-}calculated\ value}$ of the optical signal noise ratio meets a preset condition, proceeding to operation S23 if the pre-calculated value $OSNR_{pre\text{-}calculated\ value}$ of the optical signal noise ratio meets the preset condition, and proceeding to operation S24 if the pre-calculated value $OSNR_{pre\text{-}calculated\ value}$ of the optical signal noise ratio does not meet the preset condition.

In some embodiments, a case where the pre-calculated value $OSNR_{pre\text{-}calculated\ value}$ of the optical signal noise ratio meets the preset condition includes:

$OSNR_{pre\text{-}calculated\ value} - OSNR_{flatness} \geq OS$
$NR_{transmission\ threshold} OS$
$NR_{transmission\ threshold} = OSNR_{B2B} + OS$
$NR_{nonlinear} + OSNR_{CD} + OSNR_{PMD} + OSNR_{filter} +$
$OSNR_{PDL} + OSNR_{fluctuation} + OSNR_{net\ allowance}$ where $OSNR_{flatness}$ is a flatness of the optical signal noise ratio, i.e., a statistical empirical value in the OTN network;

$OSNR_{B2B}$ is a back-to-back optical signal noise ratio, and may be found in an optical module manual; $OSNR_{nonlinear}$ is a nonlinear cost of the optical signal noise ratio, $OSNR_{CD}$ is a chromatic dispersion cost of the optical signal noise ratio, $OSNR_{PMD}$ is a polarization mode dispersion cost of the optical signal noise ratio, $OSNR_{filter}$ is a filter membrane cost of the optical signal noise ratio, $OSNR_{PCL}$ is a polarization dependent loss cost of the optical signal noise ratio, and $OSNR_{fluctuation}$ is a fluctuation of the optical signal noise ratio, i.e., a statistical empirical value in the OTN network; and $OSNR_{net\ allowance}$ is a net allowance required by the optical signal noise ratio and is determined based on actual requirements, and $OSNR_{flatness}$, $OSNR_{B2B}$, $OSNR_{nonlinear}$, $OSNR_{CD}$, $OSNR_{PMD}$, $OSNR_{filter}$, $OSNR_{PCL}$, $OSNR_{fluctuation}$ and $OSNR_{net\ allowance}$ are preset values.

At operation S23, determining that a result of the IV analysis is qualified.

At operation S24, determining that the result of the IV analysis is unqualified.

In some embodiments, in a multi-hop scenario, the route of the service to be configured includes a plurality of hops. Accordingly, configuring resource parameters for the service to be configured according to the action policy in operation S11 of the single service resource configuration method described with respect to FIG. 1 includes: configuring resource parameters for the service to be configured according to the action policy in each hop. Performing IV analysis according to the action policy in operation S11 of the single service resource configuration method described with respect to FIG. 1 includes: performing IV analysis according to the action policy in each hop. Performing IV analysis in operation S11 of the single service resource configuration method described with respect to FIG. 1 includes: calculating a pre-calculated value of an optical signal noise ratio of each hop in the route of the service to be configured; determining, in response to the pre-calculated value of the optical signal noise ratio of each hop meeting a preset condition, that a result of the IV analysis is qualified; and determining, in response to the pre-calculated value of the optical signal noise ratio of at least one hop not meeting the preset condition, that the result of the IV analysis is unqualified.

Figure 4:
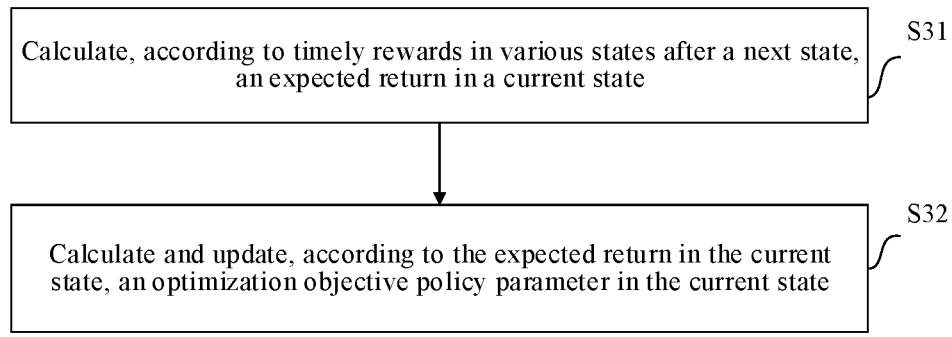
FIG. 4 is a flowchart of a method for calculating an optimization objective policy parameter according to the present disclosure.

FIG. 4 is a flowchart of a method for calculating an optimization objective policy parameter according to the present disclosure.

As shown in FIG. 4, calculating and updating, according to the timely reward in each state, the optimization objective policy parameter in each state includes the following operations S31 and S32.

At operation S31, calculating, according to timely rewards in various states after a next state, an expected return in a current state.

In some embodiments, the expected return in the current state may be calculated by:

$$G_t = \sum_{k=0}^{n-(t+1)} \gamma^k R_{t+k+1};$$

where $G_t$ is an expected return of executing action $α_t$ in state $S_t$, γ is a discount coefficient, and 0<γ<1; R is the timely reward, t is the number of resource parameters already configured in state $S_t$, t=(0, . . . , n−1), and n−1 is the total number of resource parameters.

It should be noted that the expected return in a last state is the timely reward in that state.

At operation S32, calculating and updating, according to the expected return in the current state, the optimization objective policy parameter in the current state.

Through operations S31 and S32, optimization of the optimization objective policy parameter can be achieved through a reward and punishment mechanism of the reinforcement learning algorithm.

In some embodiments, the optimization objective policy parameter may be a state behavior value $Q_\pi(s,\alpha)$, and $$Q_\pi(s,a) = E_\pi\left[\sum_{k=0}^{n-(t+1)} \gamma^k R_{t+k+1} \mid s=s_t, a=a_t\right],$$

which indicates an expected accumulative return obtained by an agent performing action $\alpha$ according to action policy $\pi(s, \alpha)$ from state $S_t$.

In some embodiments, the optimization objective policy parameter may also be a state value $V_\pi(s)$, and $$V_\pi(s) = \sum_{a \in A} \pi(a \mid s) Q_\pi(s, a),$$

which indicates a weighted sum of all state behavior values $Q_\pi(s,\alpha)$ in state S, where $\pi(\alpha\backslash s)$ is a probability of taking action $\alpha$ according to action policy $\pi(s,\alpha)$ in state S, and A is a set of actions executed in each state. It should be noted that if action policy $\pi(s,\alpha)$ is a deterministic action policy, then $V_\pi(s,\alpha)=Q_\pi(s,\alpha)$.

In some embodiments, when the optimization objective policy parameter is the state behavior value $Q_\pi(s,\alpha)$, the optimization objective policy parameter in each state may be calculated and updated with a Monte Carlo Process (MCP) algorithm, a TD-Error algorithm of different policies or a TD-Error algorithm of a same policy. In some embodiments, a Q-Learning algorithm in the TD-Error algorithm of different policies may be used, or a State-Action-Reward-Action (SASA) algorithm in the TD-Error algorithm of a same policy may be used. Accordingly, updating the action policy according to the optimal optimization objective policy parameter in each state (i.e., operation S15 of the single service resource configuration method described with respect to FIG. 1) includes: updating the action policy according to the state behavior value $Q_\pi(s,\alpha)$.

For example, if the Q-Learning algorithm or the SASA algorithm is adopted, determining the optimal optimization objective policy parameter in each state (i.e., operation S14 of the single service resource configuration method described with respect to FIG. 1) may include: determining, from the optimization objective policy parameter (i.e., state behavior value $Q_\pi(s,\alpha)$) in each state in the preset number of episodes, a maximum value of the optimal optimization objective policy parameter in each state.

In some embodiments, when the optimization objective policy parameter is the state value $V_\pi(s)$, the optimization objective policy parameter may be calculated and updated with a dynamic programming algorithm. Accordingly, updating the action policy according to the optimal optimization objective policy parameter in each state (i.e., operation S15 of the single service resource configuration method described with respect to FIG. 1) includes: updating the action policy $\mu(s,\alpha)$ according to the state value $V_\pi(s)$.

The process of implementing resource configuration of the OTN single service with the MCP algorithm, the Q-Learning algorithm, the SASA algorithm, and the dynamic programming algorithm will be described below.

(1) The process of implementing resource configuration of the OTN single service with an exploring initialization MCP algorithm includes:

```
initialize the entire network topology environment, for all s ∈ S, a ∈ A(s),
Q(s,a) ← 0; where an initial value of the action policy is μ(s,a);
returns(s,a) ← emptylist;
repeat the following processing:
{
  according to μ(s,a), select s₀ ∈ S, a₀ ∈ A(s), generate 1 new episode;
  for each pair (s,a) in the episode:
    G ← (s,a) returns after a first occurrence;
    add G to returns(s,a);
    let state behavior value Q(s,a) ← average(returns(s,a)) average the
      returns;
    for each s in the episode:
      π(s) ← arg max_a Q(s,a);
}
```

(2) The process of implementing resource configuration of the OTN single service with the Q-Learning algorithm (i.e., TD-Error of different policies) includes:

initialize the entire network topology environment, for all $s \in S, \alpha \in A(s)$, $Q(s,\alpha) \leftarrow 0$; the action policy is $\mu(s,\alpha)$;
repeat the following processing in each episode:
initialize a state space S; and
repeat (the following processing in each operation of the episode):
select action $\alpha_t$ in state $s_t$ according to a policy $\mu(s,\alpha)$;
perform action $\alpha_t$ and obtain a timely reward $R_{t+1}$ and a next state $s_{t+1}$;
let $Q(s_t,\alpha_t) \leftarrow Q(s_t, \alpha_t) + \alpha[R_{t+1} + \gamma \max_\alpha Q(s_{t+1}, \alpha) - Q(s_t, \alpha_t)]$;
where $\alpha$ is a learning rate;
$s_t \leftarrow s_{t+1}$;
until $s_t$ becomes an end state;
until all $Q(s,\alpha)$ are converged; and
output a final policy: $\pi(s) \leftarrow \arg \max_\alpha Q(s,\alpha)$.

(3) The process of implementing resource configuration of the OTN single service with the SARSA algorithm (i.e., TD-Error of a same policy) includes:

initialize the entire network topology environment, for all $s \in S, \alpha \in A(s)$, $Q(s,\alpha) \leftarrow 0$;
repeat the following processing in each episode:
initialize state space S;
give initial state $s_0$, and select action $\alpha_0$ according to greedy policy $\varepsilon$ (taking an action with a maximum timely reward); and
repeat (the following processing in each operation of the episode):
select action $\alpha_t$ in state $s_t$ according to greedy policy $\varepsilon$, to obtain a timely reward $R_{t+1}$ and a next state $s_{t+1}$;
obtain action $\alpha_{t+1}$ according to greedy policy $\varepsilon$;
let $Q(s_t, \alpha_t) \leftarrow Q(s_t, \alpha_t) + \alpha[R_{t+1} + \gamma Q(s_{t+1}, \alpha_{t+1}) - Q(s_t, \alpha_t)]$;
where $\alpha$ is a learning rate;
$s_t \leftarrow s_{t+1}$; $\alpha_t \leftarrow \alpha_{t+1}$;
until $s_t$ becomes an end state;
until all $Q(s,\alpha)$ are converged; and
output a final policy: $\pi(s) \leftarrow \arg \max_\alpha Q(s,\alpha)$.

(4) The process of implementing resource configuration of the OTN single service with the dynamic programming algorithm based on policy iteration includes the following operations 1 to 3.

At operation 1, initializing the entire network topology environment, in which for all $s_t \in S, \alpha \in A(s), V(s_t)=0$, let all $P_{ss'}{}^\alpha=1$; and initialize the action policy to $\mu(s)$.

At operation 2, evaluating the policy, $p(s_{t+1}, R_{t+1}|s_t, \mu(s))$ and $p(s_{t+1}, R_{t+1}|s_t, \alpha)$ represent probabilities of taking the corresponding action $\alpha$ in state $s_t$ with the policy $\mu(s)$;

repeat the following processing:

$\Delta \leftarrow 0$;

for each $s_t \in S$:

$v \leftarrow V(s_t)$;

$V(s_t) \leftarrow \Sigma_{s_{t+1}, R_{t+1}} p(s_{t+1}, R_{t+1}|s_{t+1}, \mu(2))[R_{t+1} + \gamma V(s_{t+1})]$;

$\Delta \leftarrow \max(\Delta, |v - V(s_t)|)$;

until $\Delta < \theta$ (where $\theta$ is a specified constant) is converged.

At operation 3, improving the policy for each $s_t \in S$:

$\alpha \leftarrow \mu(s)$;

$\mu(s) \leftarrow \arg\max_\alpha \Sigma_{s_{t+1}, R_{t+1}} p(s_{t+1}, R_{t+1}|s_t, \alpha) [R_{t+1} + \gamma V(s_{t+1})]$;

if $\alpha \neq \mu(s)$, it represents that the policy is not converged; otherwise, the policy is converged; and end the algorithm if the policy is converged and return to $V(s)$ and $\mu(s)$; otherwise, return to the processing in operation 2.

The present disclosure can be applied to the field of intelligent management and control and operation and maintenance of optical networks, and comprehensively optimize various resources and performance indexes of a OTN single service through reinforcement learning, and thus provide an OTN service path with optimized comprehensive indexes for a user. The reinforcement learning algorithm makes path comprehensive optimization possible, and an ideal path optimization result can be intelligently obtained through iterative improvement of the action policy.

Figure 5:
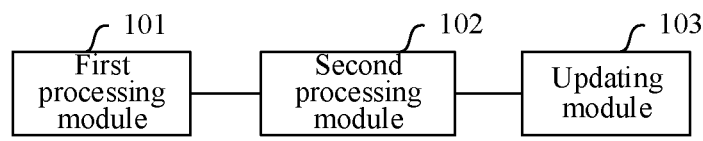
FIG. 5 is a schematic structural diagram of a single service resource configuration apparatus according to the present disclosure.

FIG. 5 is a schematic structural diagram of a single service resource configuration apparatus according to the present disclosure. As shown in FIG. 5, the single service resource configuration apparatus according to the present disclosure includes a first processing module 101, a second processing module 102 and an updating module 103. The first processing module 101 is configured to configure resource parameters for a service to be configured according to an action policy, calculate a timely reward in a current state, perform, after all the resource parameters are configured, IV analysis according to the action policy, and end one episode after the IV analysis is completed, where a next state is entered after an action in the action policy is completed, and the action includes an action of configuring a resource parameter or an action of performing IV analysis; calculate and update, according to the timely reward in each state, an optimization objective policy parameter in each state; and iterate a preset number of episodes to calculate and update the optimization objective policy parameter in each state.

The second processing module 102 is configured to determine, according to the optimization objective policy parameter in each state in the preset number of episodes, an optimal optimization objective policy parameter in each state.

The updating module 103 is configured to update the action policy according to the optimal optimization objective policy parameter in each state.

In some embodiments, the resource parameters include a route, a wavelength, a spectrum, and a modulation format, and the resource parameters are configured for the service to be configured within one episode in a sequence of: configuring the route, configuring the wavelength, configuring the spectrum, and configuring the modulation format.

In some embodiments, the states include: a route to be configured state, a wavelength to be configured state, a spectrum to be configured state, a modulation format to be configured state, an IV analysis to be performed state, and an end state. In the route to be configured state, the timely reward $R_0=0$, and in other states, the timely rewards meet any one or combination of the following conditions:

(1) in the wavelength to be configured state, a timely reward $R_1$ is a function of a working route cost, and $R_1$ and the working route cost is monotonically decreasing;

(2) in the spectrum to be configured state, a timely reward $R_2$ is a function of a wavelength resource utilization rate, and $R_2$ and the wavelength resource utilization rate is monotonically increasing;

(3) in the modulation format to be configured state, a timely reward $R_3$ is a function of service occupied bandwidth, and $R_3$ and the service occupied bandwidth is monotonically decreasing;

(4) in the IV analysis to be performed state, a timely reward $R_4$ is a function of a service spectral efficiency, and $R_4$ and the service spectral efficiency is monotonically increasing;

(5) in the end state, a timely reward $R_5$ is related to a result of the IV analysis, wherein $R_5$ is positive when the result of the IV analysis is qualified, and $R_5$ is negative when the result of the IV analysis is unqualified.

In some embodiments, the action policy includes a random action policy and a deterministic action policy, and the first processing module 101 is configured to configure a route, a wavelength, a frequency spectrum and a modulation format for the service to be configured according to the random action policy; and perform IV analysis according to the deterministic action policy.

In some embodiments, when the route of the service to be configured includes a plurality of hops, the first processing module 101 is configured to configure resource parameters for the service to be configured according to the action policy in each hop; and perform IV analysis according to the action policy in each hop.

The first processing module 101 is configured to calculate a pre-calculated value of an optical signal noise ratio of each hop in the route of the service to be configured; determine, in response to the pre-calculated value of the optical signal noise ratio of each hop meeting a preset condition, that a result of the IV analysis is qualified; and determine, in response to the pre-calculated value of the optical signal noise ratio of at least one hop not meeting the preset condition, that the result of the IV analysis is unqualified.

In some embodiments, the first processing module 101 is configured to calculate a pre-calculated value of an optical signal noise ratio of the service to be configured; determine, in response to the pre-calculated value of the optical signal noise ratio meeting a preset condition, that a result of the IV analysis is qualified; and determine, in response to the pre-calculated value of the optical signal noise ratio not meeting the preset condition, that the result of the IV analysis is unqualified.

In some embodiments, a case where pre-calculated value of the optical signal noise ratio meets the preset condition includes:

$OSNR_{pre\text{-}calculated\ value} - OSNR_{flatness} \geq OS$
$NR_{transmission\ threshold}; OS$
$NR_{transmission\ threshold} = OSNR_{B2B} +$ $OSNR_{nonlinear} + OSNR_{CD} + OSNR_{PMD} + OSNR_{filter} + OSNR_{PDL} + OSNR_{fluctuation} + OSNR_{net\ allowance}$, where $OSNR_{pre-calculated\ value}$ is the pre-calculated value of the optical signal noise ratio, $OSNR_{flatness}$ is a flatness of the optical signal noise ratio, $OSNR_{B2B}$ is a back-to-back optical signal noise ratio, $OSNR_{nonlinear}$ is a nonlinear cost of the optical signal noise ratio, $OSNR_{CD}$ is a chromatic dispersion cost of the optical signal noise ratio, $OSNR_{PMD}$ is a polarization mode dispersion cost of the optical signal noise ratio, $OSNR_{filter}$ is a filter membrane cost of the optical signal noise ratio, $OSNR_{PDL}$ is a polarization dependent loss cost of the optical signal noise ratio, $OSNR_{fluctuation}$ is a fluctuation of the optical signal noise ratio, $OSNR_{net\ allowance}$ is a net allowance required by the optical signal noise ratio, and $OSNR_{flatness}$, $OSNR_{B2B}$, $OSNR_{nonlinear}$, $OSNR_{CCC}$, $OSNR_{PMD}$, $OSNR_{filter}$, $OSNR_{PDL}$, $OSNR_{fluctuation}$, and $OSNR_{new\ allowance}$ are preset values.

In some embodiments, the first processing module 101 is configured to calculate, according to timely rewards in various states after a next state, an expected return in a current state; and calculate and update, according to the expected return in the current state, the optimization objective policy parameter in the current state.

In some embodiments, the first processing module 101 is configured to calculate the expected return in the current state by:

$$G_t = \sum_{k=0}^{n-(t+1)} \gamma^k R_{t+k+1};$$

where $G_t$ is an expected return of executing action $\alpha_t$, in state $S_t$, $\gamma$ is a discount coefficient, and $0 < \gamma < 1$; R is the timely reward, t is the number of resource parameters already configured in state $S_t$, $t = (0, \ldots, n-1)$, and $n-1$ is the total number of resource parameters.

In some embodiments, the optimization objective policy parameter includes a state behavior value $Q_\pi(s, \alpha)$, and $$Q_\pi(s, a) = E_\pi \left[ \sum_{k=0}^{n-(t+1)} \gamma^k R_{t+k+1} \mid s = s_t, a = a_t \right],$$

or the optimization objective policy parameter includes a state value $V_\pi(s)$, $$V_\pi(s) = \sum_{a \in A} \pi(a \mid s) Q_\pi(s, a),$$

where $\pi(\alpha|s)$ is a probability of taking action $\alpha$ according to an action policy $\pi(s,\alpha)$ in state S, and A is a set of actions executed in each state.

In some embodiments, the first processing module 101 is configured to calculate and update, when the optimization objective policy parameter is the state behavior value $Q_\pi(s, \alpha)$, the optimization objective policy parameter in each state with a Monte Carlo Process algorithm, a TD-Error algorithm of different policies or a TD-Error algorithm of a same policy.

The updating module 103 is configured to update the action policy according to the state behavior value $Q_\pi(s, \alpha)$.

In some embodiments, the first processing module 101 is configured to calculate, when the optimization objective policy parameter is the state value $V_\pi(s)$, the optimization objective policy parameter with a dynamic programming algorithm.

The updating module 103 is configured to update the action policy according to the state value $V_\pi(s)$.

The present disclosure provides a computer device, including: one or more processors and a storage means. The storage means has one or more programs stored thereon which, when executed by the one or more processors, cause the one or more processors to perform the single service resource configuration method described in any of the above embodiments.

The present disclosure further provides a computer-readable medium storing a computer program thereon which, when executed, causes the single service resource configuration method described in any of the above embodiments to be implemented.

Those of ordinary skill in the art will appreciate that all or some operations of the above described method, functional modules/units in the apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components. Some or all physical components may be implemented as software executed by a processor, such as a CPU, a digital signal processor or microprocessor, or implemented as hardware, or implemented as an integrated circuit, such as an application specific integrated circuit. Such software may be distributed on a computer-readable medium which may include a computer storage medium (or non-transitory medium) and communication medium (or transitory medium). The term computer storage medium includes volatile and nonvolatile, removable and non-removable media implemented in any method or technology for storage of information such as computer-readable instructions, data structures, program modules or other data, as is well known to those of ordinary skill in the art. The computer storage medium includes, but is not limited to, an RAM, an ROM, an EEPROM, a flash or any other memory technology, a CD-ROM, a digital versatile disc (DVD) or any other optical disc storage, a magnetic cartridge, a magnetic tape, a magnetic disk storage or any other magnetic storage device, or may be any other medium used for storing the desired information and accessible by a computer. Moreover, it is well known to those ordinary skilled in the art that a communication medium typically includes a computer-readable instruction, a data structure, a program module, or other data in a modulated data signal, such as a carrier wave or other transport mechanism, and may include any information delivery medium.

The present disclosure has disclosed exemplary embodiments, and although specific terms are employed, they are used and should be interpreted merely in a generic and descriptive sense, not for purposes of limitation. In some instances, as would be apparent to one skilled in the art, features, characteristics and/or elements described in connection with a particular embodiment may be used alone or in combination with features, characteristics and/or elements described in connection with another embodiment, unless expressly stated otherwise. It will, therefore, be understood by those skilled in the art that various changes in form and details may be made therein without departing from the scope of the present disclosure as set forth in the appended claims.

What is claimed is:

1. A resource configuration method for Optical Transport Network (OTN) single service, comprising:
configuring resource parameters for a service to be configured according to an action policy, calculating a timely reward in a current state, performing, after all the resource parameters are configured, impairment verification analysis according to the action policy, and ending one episode after the impairment verification analysis is completed, wherein a next state is entered after an action in the action policy is completed, and the action comprises an action of configuring a resource parameter or an action of performing impairment verification analysis, wherein the resource parameters comprise a route, a wavelength, a spectrum, and a modulation format;
calculating and updating, according to the timely reward in each state, an optimization objective policy parameter in each state;
iterating a preset number of episodes to calculate and update the optimization objective policy parameter in each state;
determining, according to the optimization objective policy parameter in each state in the preset number of episodes, an optimal optimization objective policy parameter in each state; and
updating the action policy according to the optimal optimization objective policy parameter in each state.

2. The method according to claim 1, wherein the resource parameters are configured for the service to be configured within one episode in a sequence of: configuring the route, configuring the wavelength, configuring the spectrum, and configuring the modulation format.

3. The method according to claim 2, wherein the state comprises: a route to be configured state, a wavelength to be configured state, a spectrum to be configured state, a modulation format to be configured state, an impairment verification analysis to be performed state, and an end state, in the route to be configured state, the timely reward $R_0=0$, and in other states, the timely rewards meet any one or combination of the following conditions:
in the wavelength to be configured state, a timely reward $R_1$ is a function of a working route cost, and $R_1$ and the working route cost is monotonically decreasing;
in the spectrum to be configured state, a timely reward $R_2$ is a function of a wavelength resource utilization rate, and $R_2$ and the wavelength resource utilization rate is monotonically increasing;
in the modulation format to be configured state, a timely reward $R_3$ is a function of service occupied bandwidth, and $R_3$ and the service occupied bandwidth is monotonically decreasing;
in the impairment verification analysis to be performed state, a timely reward $R_4$ is a function of a service spectral efficiency, and $R_4$ and the service spectral efficiency is monotonically increasing; or
in the end state, a timely reward $R_5$ is related to a result of the impairment verification analysis, wherein $R_5$ is positive when the result of the impairment verification analysis is qualified, and $R_5$ is negative when the result of the impairment verification analysis is unqualified.

4. The method according to claim 2, wherein the action policy comprises a random action policy and a deterministic action policy, and configuring resource parameters for the service to be configured according to the action policy comprises: configuring a route, a wavelength, a frequency spectrum and a modulation format for the service to be configured according to the random action policy, and
performing impairment verification analysis according to the action policy comprises: performing impairment verification analysis according to the deterministic action policy.

5. The method according to claim 2, wherein in a case where the route of the service to be configured comprises a plurality of hops,
configuring resource parameters for the service to be configured according to the action policy comprises: configuring resource parameters for the service to be configured according to the action policy in each hop,
performing impairment verification analysis according to the action policy comprises: performing impairment verification analysis according to the action policy in each hop, and
performing impairment verification analysis comprises:
calculating a pre-calculated value of an optical signal noise ratio of each hop in the route of the service to be configured;
determining, in response to the pre-calculated value of the optical signal noise ratio of each hop meeting a preset condition, that a result of the impairment verification analysis is qualified; and
determining, in response to the pre-calculated value of the optical signal noise ratio of at least one hop not meeting the preset condition, that the result of the impairment verification analysis is unqualified.

6. The method according to claim 5, wherein a case where pre-calculated value of the optical signal noise ratio meets the preset condition comprises:

$OSNR_{pre\text{-}calculated\ value} - OSNR_{flatness} \geq OSNR_{transmission\ threshold}$,
$OSNR_{transmission\ threshold} = OSNR_{B2B} + OSNR_{nonlinear} + OSNR_{CD} + OSNR_{PMD} + OSNR_{filter} + OSNR_{PDL} + OSNR_{fluctuation} + OSNR_{net\ allowance}$, wherein $OSNR_{pre\text{-}calculated\ value}$ is the pre-calculated value of the optical signal noise ratio, $OSNR_{flatness}$ is a flatness of the optical signal noise ratio, $OSNR_{B2B}$ is a back-to-back optical signal noise ratio, $OSNR_{nonlinear}$ is a nonlinear cost of the optical signal noise ratio, $OSNR_{CD}$ is a chromatic dispersion cost of the optical signal noise ratio, $OSNR_{PMD}$ is a polarization mode dispersion cost of the optical signal noise ratio, $OSNR_{filter}$ is a filter membrane cost of the optical signal noise ratio, $OSNR_{PDL}$ is a polarization dependent loss cost of the optical signal noise ratio, $OSNR_{fluctuation}$ is a fluctuation of the optical signal noise ratio, $OSNR_{net\ allowance}$ is a net allowance required by the optical signal noise ratio, and $OSNR_{flatness}$, $OSNR_{B2B}$, $OSNR_{nonlinear}$, $OSNR_{CD}$, $OSNR_{PMD}$, $OSNR_{filter}$, $OSNR_{PDL}$, $OSNR_{fluctuation}$ and $OSNR_{net\ allowance}$ are preset values.

7. The method according to claim 1, wherein performing impairment verification analysis comprises:
calculating a pre-calculated value of an optical signal noise ratio of the service to be configured;
determining, in response to the pre-calculated value of the optical signal noise ratio meeting a preset condition, that a result of the impairment verification analysis is qualified; and determining, in response to the pre-calculated value of the optical signal noise ratio not meeting the preset condition, that the result of the impairment verification analysis is unqualified.

8. The method according to claim 7, wherein a case where pre-calculated value of the optical signal noise ratio meets the preset condition comprises:

$OSNR_{pre\text{-}calculated\ value} - OSNR_{flatness} \geq OSNR_{transmission\ threshold}$, $OSNR_{transmission\ threshold} = OSNR_{B2B} + OSNR_{nonlinear} + OSNR_{CD} + OSNR_{PMD} + OSNR_{filter} + OSNR_{PDL} + OSNR_{fluctuation} + OSNR_{net\ allowance}$, wherein $OSNR_{pre\text{-}calculated\ value}$ is the pre-calculated value of the optical signal noise ratio, $OSNR_{flatness}$ is a flatness of the optical signal noise ratio, $OSNR_{B2B}$ is a back-to-back optical signal noise ratio, $OSNR_{nonlinear}$ is a nonlinear cost of the optical signal noise ratio, $OSNR_{CD}$ is a chromatic dispersion cost of the optical signal noise ratio, $OSNR_{PMD}$ is a polarization mode dispersion cost of the optical signal noise ratio, $OSNR_{filter}$ is a filter membrane cost of the optical signal noise ratio, $OSNR_{PDL}$ is a polarization dependent loss cost of the optical signal noise ratio, $OSNR_{fluctuation}$ is a fluctuation of the optical signal noise ratio, $OSNR_{net\ allowance}$ is a net allowance required by the optical signal noise ratio, and $OSNR_{flatness}$, $OSNR_{B2B}$, $OSNR_{nonlinear}$, $OSNR_{CD}$, $OSNR_{PMD}$, $OSNR_{filter}$, $OSNR_{PDL}$, $OSNR_{fluctuation}$ and $OSNR_{net\ allowance}$ are preset values.

9. The method according to claim 1, wherein calculating and updating, according to the timely reward in each state, the optimization objective policy parameter in each state comprises:
calculating, according to timely rewards in various states after a next state, an expected return in a current state; and
calculating and updating, according to the expected return in the current state, the optimization objective policy parameter in the current state.

10. The method according to claim 9, wherein the expected return in the current state is calculated by:

$$G_t = \sum_{k=0}^{n-(t+1)} \gamma^k R_{t+k+1},$$

wherein $G_t$ is an expected return of executing action $\alpha_t$ in state $S_t$, $\gamma$ is a discount coefficient, and $0<\gamma<1$; R is the timely reward, t is the number of resource parameters already configured in state $S_t$, t=(0, ..., n−1), and n−1 is the total number of resource parameters.

11. The method according to claim 9, wherein the optimization objective policy parameter comprises a state behavior value $Q_\pi(s,\alpha)$, $$Q_\pi(s, a) = E_\pi\left[\sum_{k=0}^{n-(t+1)} \gamma^k R_{t+k+1} \mid s = s_t, a = a_t\right],$$

the optimization objective policy parameter comprises a state value $$V_\pi(s),\ V_\pi(s) = \sum_{a \in A} \pi(a \mid s) Q_\pi(s, a),$$

wherein $\pi(\alpha|s)$ is a probability of taking action a according to an action policy $\pi(s,\alpha)$ in state S, and A is a set of actions executed in each state.

12. The method according to claim 11, wherein when the optimization objective policy parameter is the state behavior value $Q_\pi(s,\alpha)$, the optimization objective policy parameter in each state is calculated and updated with a Monte Carlo Process algorithm, a TD-Error algorithm of different policies or a TD-Error algorithm of a same policy, and
updating the action policy according to the optimal optimization objective policy parameter in each state comprises: updating the action policy according to the state behavior value $Q_{90}(s,\alpha)$.

13. The method according to claim 11, wherein when the optimization objective policy parameter is the state value $V_\pi(s)$, the optimization objective policy parameter is calculated with a dynamic programming algorithm; and
updating the action policy according to the optimal optimization objective policy parameter in each state comprises: updating the action policy according to the state value $V_\pi(s)$.

14. A computer device, comprising:
one or more processors; and
a storage means having one or more programs stored thereon,
wherein the one or more programs, when executed by the one or more processors, cause the one or more processors to implement a resource configuration method for Optical Transport Network (OTN) single service comprising:
configuring resource parameters for a service to be configured according to an action policy, calculating a timely reward in a current state, performing, after all the resource parameters are configured, impairment verification analysis according to the action policy, and ending one episode after the impairment verification analysis is completed, wherein a next state is entered after an action in the action policy is completed, and the action comprises an action of configuring a resource parameter or an action of performing impairment verification analysis, wherein the resource parameters comprise a route, a wavelength, a spectrum, and a modulation format;
calculating and updating, according to the timely reward in each state, an optimization objective policy parameter in each state;
iterating a preset number of episodes to calculate and update the optimization objective policy parameter in each state;
determining, according to the optimization objective policy parameter in each state in the preset number of episodes, an optimal optimization objective policy parameter in each state; and
updating the action policy according to the optimal optimization objective policy parameter in each state.

15. The computer device according to claim 14, wherein the resource parameters are configured for the service to be configured within one episode in a sequence of: configuring the route, configuring the wavelength, configuring the spectrum, and configuring the modulation format.

16. The computer device according to claim 15, wherein the state comprises: a route to be configured state, a wavelength to be configured state, a spectrum to be configured state, a modulation format to be configured state, an impairment verification analysis to be performed state, and an end state, in the route to be configured state, the timely reward $R_o=0$, and in other states, the timely rewards meet any one or combination of the following conditions:

in the wavelength to be configured state, a timely reward $R_1$ is a function of a working route cost, and $R_1$ and the working route cost is monotonically decreasing;

in the spectrum to be configured state, a timely reward $R_2$ is a function of a wavelength resource utilization rate, and $R_2$ and the wavelength resource utilization rate is monotonically increasing;

in the modulation format to be configured state, a timely reward $R_3$ is a function of service occupied bandwidth, and $R_3$ and the service occupied bandwidth is monotonically decreasing;

in the impairment verification analysis to be performed state, a timely reward $R_4$ is a function of a service spectral efficiency, and $R_4$ and the service spectral efficiency is monotonically increasing; or in the end state, a timely reward $R_5$ is related to a result of the impairment verification analysis, wherein $R_5$ is positive when the result of the impairment verification analysis is qualified, and $R_5$ is negative when the result of the impairment verification analysis is unqualified.

17. The computer device according to claim 15, wherein the action policy comprises a random action policy and a deterministic action policy, and configuring resource parameters for the service to be configured according to the action policy comprises: configuring a route, a wavelength, a frequency spectrum and a modulation format for the service to be configured according to the random action policy, and performing impairment verification analysis according to the action policy comprises: performing impairment verification analysis according to the deterministic action policy.

18. A non-transitory computer-readable medium storing a computer program thereon, wherein the program, when executed by a processor, causes the processor to implement a resource configuration method for Optical Transport Network (OTN) single service comprising:

configuring resource parameters for a service to be configured according to an action policy, calculating a timely reward in a current state, performing, after all the resource parameters are configured, impairment verification analysis according to the action policy, and ending one episode after the impairment verification analysis is completed, wherein a next state is entered after an action in the action policy is completed, and the action comprises an action of configuring a resource parameter or an action of performing impairment verification analysis, wherein the resource parameters comprise a route, a wavelength, a spectrum, and a modulation format;

calculating and updating, according to the timely reward in each state, an optimization objective policy parameter in each state;

iterating a preset number of episodes to calculate and update the optimization objective policy parameter in each state;

determining, according to the optimization objective policy parameter in each state in the preset number of episodes, an optimal optimization objective policy parameter in each state; and updating the action policy according to the optimal optimization objective policy parameter in each state.

19. The non-transitory computer-readable medium according to claim 18, wherein the resource parameters are configured for the service to be configured within one episode in a sequence of: configuring the route, configuring the wavelength, configuring the spectrum, and configuring the modulation format.

20. The non-transitory computer-readable medium according to claim 19, wherein the state comprises: a route to be configured state, a wavelength to be configured state, a spectrum to be configured state, a modulation format to be configured state, an impairment verification analysis to be performed state, and an end state, in the route to be configured state, the timely reward $R_0$=6 0, and in other states, the timely rewards meet any one or combination of the following conditions:

in the wavelength to be configured state, a timely reward $R_1$ is a function of a working route cost, and $R_1$ and the working route cost is monotonically decreasing;

in the spectrum to be configured state, a timely reward $R_2$ is a function of a wavelength resource utilization rate, and $R_2$ and the wavelength resource utilization rate is monotonically increasing;

in the modulation format to be configured state, a timely reward $R_3$ is a function of service occupied bandwidth, and $R_3$ and the service occupied bandwidth is monotonically decreasing;

in the impairment verification analysis to be performed state, a timely reward $R_4$ is a function of a service spectral efficiency, and $R_4$ and the service spectral efficiency is monotonically increasing; or in the end state, a timely reward $R_5$ is related to a result of the impairment verification analysis, wherein $R_5$ is positive when the result of the impairment verification analysis is qualified, and $R_5$ is negative when the result of the impairment verification analysis is unqualified.

* * * * *